United States Patent [19]
Lane, Jr.

[11] Patent Number: 4,723,057
[45] Date of Patent: Feb. 2, 1988

[54] MULTIPLE FUNCTION CONTROL STALK HAVING LINEARLY MOVABLE WIPER DELAY RHEOSTAT

[75] Inventor: Wendell C. Lane, Jr., Laurinburg, N.C.

[73] Assignee: Dana Corporation, Toledo, Ohio

[21] Appl. No.: 774,320

[22] Filed: Sep. 10, 1985

[51] Int. Cl.⁴ ............................................. H01H 9/02
[52] U.S. Cl. ........................ 200/61.27; 200/61.54; 15/250.12
[58] Field of Search ............ 200/61.27, 61.54, 153 D, 200/4; 318/443, 444, DIG. 2; 15/250.12; 338/194

[56] References Cited

U.S. PATENT DOCUMENTS

| | | | |
|---|---|---|---|
| 3,431,529 | 3/1969 | Bang | 338/194 |
| 3,499,125 | 3/1970 | Stoi | 200/4 |
| 3,511,943 | 5/1970 | Kibler | 200/4 |
| 3,761,662 | 9/1973 | Charles | 200/153 D |
| 3,849,711 | 11/1974 | Elliott et al. | 318/444 |
| 3,934,101 | 1/1976 | Jones | 200/5 B |
| 3,996,433 | 12/1976 | Suzuki et al. | 200/61.27 |
| 4,003,388 | 1/1977 | Nopanen | 338/194 |
| 4,219,706 | 8/1980 | Koch et al. | 200/4 |
| 4,219,709 | 8/1980 | Scarbro | 200/61.54 |
| 4,321,437 | 3/1982 | Cryer | 200/61.54 |
| 4,328,431 | 5/1982 | Usami | 307/10 R |
| 4,376,237 | 3/1983 | Long | 200/61.27 |
| 4,387,279 | 6/1983 | Brevick | 200/61.54 |
| 4,393,341 | 7/1983 | Byrne | 318/443 |
| 4,400,598 | 8/1983 | Jandl et al. | 200/16 D |
| 4,408,104 | 10/1983 | Iwata et al. | 200/61.54 |
| 4,625,157 | 11/1986 | Phillimore | 318/443 |

FOREIGN PATENT DOCUMENTS

| | | | |
|---|---|---|---|
| 58-536 | 4/1982 | Japan | 15/250.12 |
| 2039346 | 8/1980 | United Kingdom | 200/61.54 |

*Primary Examiner*—Charles Frankfort
*Assistant Examiner*—W. Morris Worth
*Attorney, Agent, or Firm*—MacMillan, Sobanski & Todd

[57] ABSTRACT

The present invention relates to a multiple function control stalk for a vehicle having a linearly moveable wiper delay rheostat. The control stalk includes a plurality of switches for controlling various devices on the vehicle, such as the windshield wiper and washer controls and vehicle speed or cruise controls. A windshield wiper delay switch is provided on the control stalk which includes a rheostat having an arm which is linearly moveable in a direction generally parallel to the longitudinal axis of the control stalk. The wiper delay rheostat is disposed slightly above the body of the control stalk for easy viewing and manipulation by the vehicle driver. Movement of the arm of the wiper delay rheostat varies the electrical resistance thereof and, consequently, causes an electrical control circuit to alter the period of delay between successive cycles of operation of the windshield wipers.

9 Claims, 3 Drawing Figures

MULTIPLE FUNCTION CONTROL STALK HAVING LINEARLY MOVABLE WIPER DELAY RHEOSTAT

BACKGROUND OF THE INVENTION

The present invention relates in general to switch mechanisms for regulating the operations of various devices in vehicles and in particular to a multiple function control stalk having a linearly movable wiper delay rheostat.

It is well known to provide a multiple function control stalk on a turn signal lever of a vehicle. Such a control stalk typically carries a plurality of switches and permits a driver to regulate the operation of several devices within the vehicle from a single convenient location. The controlled devices can include the off/low speed/high speed windshield wiper controls, the delay windshield wiper controls, the windshield washer controls, and the vehicle speed or cruise controls, as well as the turn signal controls. In the absence of such multiple function control stalks, the various switches which regulate the operations of these controlled devices would be inconveniently scattered about the dashboard of the vehicle or elsewhere, especially those switches which regulate devices that are not provided as standard equipment in the vehicle.

An important consideration in designing a multiple function control stalk is that the operation thereof must be simple and easy for the vehicle driver. Otherwise, the driver may be distracted from driving the vehicle while attempting to manipulate one of the switches. Obviously, a very unsafe condition is created when this occurs. Unfortunately, as more and more switches are provided on the control stalk, the operation thereof becomes increasingly complicated.

Another important consideration in the design of such a multiple function control stalk is the ease of installation, especially when the control stalk includes switches for regulating devices which are not provided standard equipment on the vehicle. Frequently, the installation of such control stalks requires the removal of the steering wheel so that additional control components can be inserted in the steering column. Such an installation procedure is both expensive and time consuming.

SUMMARY OF THE INVENTION

The present invention relates to a multiple function control stalk for a vehicle having a linearly moveable wiper delay rheostat. The control stalk includes a plurality of switches for controlling various devices on the vehicle, such as the windshield wiper and washer controls and vehicle speed or cruise controls. A windshield wiper delay switch is provided on the control stalk which includes a rheostat having an arm which is linearly moveable in a direction generally parallel to the longitudinal axis of the control stalk. The wiper delay rheostat is disposed slightly above the body of the control stalk for easy viewing and manipulation by the vehicle driver. Movement of the arm of the wiper delay rheostat varies the electrical resistance thereof and, consequently, causes an electrical control circuit to alter the period of delay between successive cycles of operation of the windshield wipers.

It is an object of the present invention to provide an improved multiple function control stalk including a linearly moveable wiper delay rheostat.

It is another object of the present invention to provide such an improved control stalk which is easily viewed and manipulated by a vehicle driver while the vehicle is being driven.

It is a further object of the present invention to provide such an improved control stalk which is simple and inexpensive to install.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENTS

Figure 1:
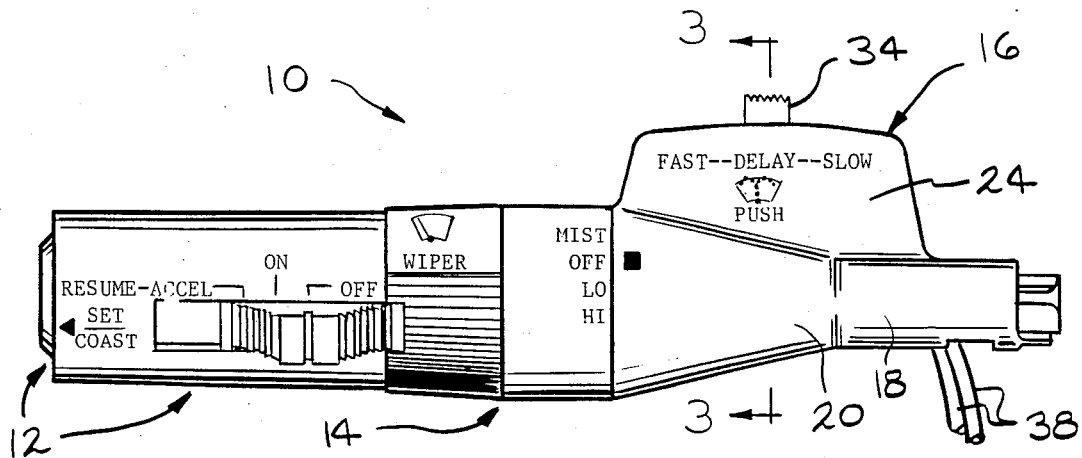
FIG. 1 is a front elevational view of an improved control stalk in accordance with the present invention.
Figure 2:
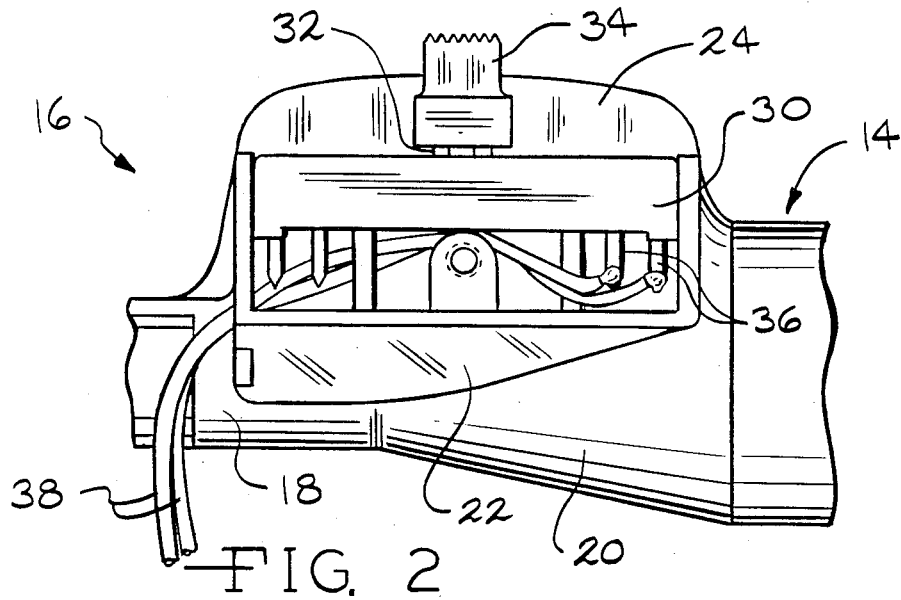
FIG. 2 is an enlarged fragmentary rear elevational view of the control stalk of FIG. 1 with the protective rear cover removed.
Figure 3:
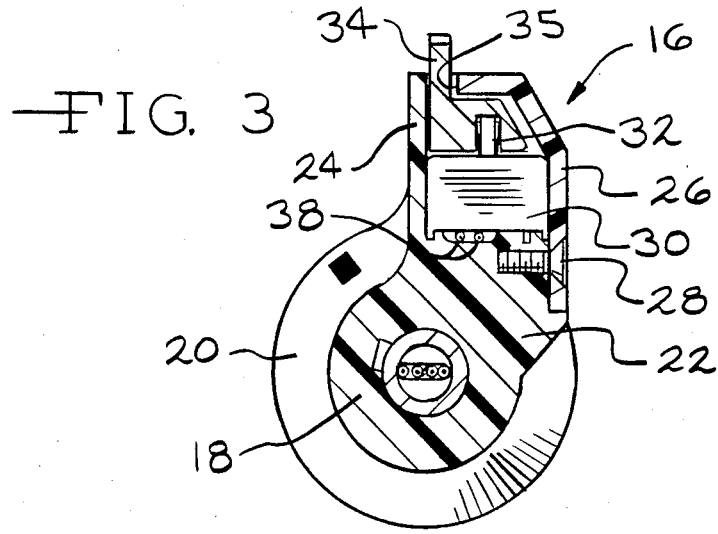
FIG. 3 is a sectional elevational view taken along line 3—3 of FIG. 1.

Referring now to the drawings, there is illustrated an improved control stalk 10 for a vehicle (not shown) in accordance with the present invention. The control stalk 10 is generally cylindrical in shape and is adapted to be co-axially connected in a conventional manner to a turn signal lever (not shown) extending radially outwardly from a steering column (not shown) of the vehicle. The control stalk 10 can include a first plurality of switches 12 adapted to control the actual speed of the vehicle at or about a predetermined desired speed (commonly referred to as "cruise" controls), a second plurality of switches 14 adapted to control the operation of conventional off/low speed/high speed windshield wipers (not shown), and a switch assembly 16 adapted to vary the amount of time between successive cycles of operation of the windshield wipers (commonly referred to as "delay" windshield wiper operation). The cruise control switches 12 and the windshield wiper control switches 14 are conventional in the art and form no part of the present invention. Although the present invention will be described and illustrated in the context of the control stalk 10 including the above-described pluralities of switches 12 and 14, it will be appreciated that the present invention can be utilized on control stalks having pluralities of switches which vary both in number and function than those illustrated. Also, it will be equally appreciated that the switch assembly 16 can be utilized to regulate the operation of a device other than the delay control for the windshield wipers.

The wiper delay switch assembly 16 includes a housing defined in part by a generally hollow cylindrical portion 18 and a hollow frusto-conical portion 20 of the control stalk 10. The cylindrical portion 18 and the frusto-conical portion 20 can be formed integrally and co-axially so as to define a longitudinal axis of the control stalk 10. An enlarged rear portion 22 of the housing is provided on both the cylindrical portion 18 and the frusto-conical portion 20. A generally flat upstanding front panel 24 extends generally radially outwardly the cylindrical portion 18 and the frusto-conical portion 20. A rear cover 26, generally L-shaped in cross section, extends upwardly from the rear enlarged portion 22 and across to the panel 24 to close the housing. The rear cover 26 is removably secured to the enlarged portion 22 by a threaded fastener 28 or other means.

Within the housing of the wiper delay switch assembly 16, a linear rheostat 30 is enclosed. The rheostat 30 is a conventional device in which the electrical resistance thereof varies continuously from a relatively small amount, when the arm 32 is positioned at one end thereof, to a relatively large amount, when the arm 32 is positioned at the opposite end thereof. The rheostat 30 includes an upstanding arm 32 which is linearly movable throughout the length of the rheostat 30. A button 34 is attached to the arm 32 and extends upwardly through a slot 35 formed between portions of the rear cover 26 and the front panel 24 of the wiper delay switch assembly 16. A pair of electrical contacts 36 extend downwardly from the rheostat 30. Respective wires 38 are connected to the contacts 36 for connecting the rheostat 30 to a conventional electronic circuit (not shown) for controlling the amount of delay between successive cycles of operation of the windshield wipers.

The control stalk 10 of the present invention is particularly advantageous in two respects, namely, installation and operation. With respect to installation, the control stalk 10 is quickly and easily installed in virtually any type of vehicle, even if the delay windshield wiper feature is not provided as standard equipment in the vehicle. In the past, such an "add-on" delay windshield wiper device utilized a variable electrical resistance component which was manually operable to regulate the amount of delay between successive cycles of operation of the windshield wipers. Typically, this variable electrical resistance component consisted of a potentiometer having a rotatable member adapted to vary the amount of electrical resistance thereof. For various reasons, mainly space considerations, the potentiometer was disposed in the steering column of the vehicle and was connected to a rotatable knob located at the far end of the control stalk by means of a shaft extending throughout the length of the control stalk. Unfortunately, the steering wheel had to be removed from the steering column in order to permit the installation of the potentiometer therein. The present invention avoids the necessity of removing the steering wheel because the variable electrical resistance device (the rheostat 30) is disposed within the control stalk 10 itself. Thus, only the wires 38 need to pass through the steering column to the electronic circuit located at the windshield wiper motor. The threading of such wires 38 through the steering column can be accomplished very easily without the removal of the steering wheel. Thus, the present invention provides an important advantage in installation over prior art control stalks.

With respect to operation, the present invention also enjoys several significant advantages. The driver of the vehicle initially operates the second plurality of switches 14 in a known manner, such as by rotation, to actuate the windshield wipers for operation at a low speed. The button 34 can then be moved by the driver either to the left or to the right, when viewing FIG. 1, so as to increase or decrease the effective electrical resistance of the rheostat 30. The electronic circuit is responsive to the amount of electrical resistance of the rheostat 30 for regulating the amount of delay between successive cycles of operation of the windshield wipers. If the button 34 is moved far toward the left, when viewing FIG. 1, the windshield wipers will be actuated in virtually continuous operation, since the amount of delay between successive cycles of operation thereof will be relatively small. As the button 34 is moved toward the right, when viewing FIG. 1, the amount of delay between successive cycles of operation of the windshield wipers will be gradually increased.

As shown in FIG. 1, the button 34 is located slightly above the wiper delay assembly 16 and is linearly movable in a direction which is generally parallel to the longitudinal axis of the control stalk 10. As a result, the button 34 is prominently located in a position which will be readily viewed by the driver of the vehicle, even while the vehicle is being driven. Also, since the button 34 is located above the generally flat rectangular wiper delay switch assembly 16, as opposed to the generally cylindrical shape of the rest of the control stalk 10, the button 34 can easily be located by the driver by feel alone, not requiring the driver to divert his eyes from the road when trying to locate the button 34. Since the button 34 is linearly movable in a direction which is parallel to the longitudinal axis of the control stalk 10, it will be appreciated that the present invention provides a switch which is both easy to locate and to operate. Also, since the effective resistance of the rheostat 30 typically varies linearly with the relative position of the arm 32 and the button 34 therein, the driver can estimate the amount of delay at which the windshield wipers will be actuated simply by seeing or feeling the position of the button 34 relative to the wiper delay switch assembly 16. For example, if the driver sees or feels that the button 34 is moved far to the left of the wiper delay switch housing 16, when viewing FIG. 1, he will know that the windshield wipers are or will be driven at or near their fastest speed, with a relatively small amount of delay operation. Similarly, if the driver sees or feels that the button 34 is moved far to the right relative to the wiper delay switch housing 16, when viewing FIG. 1, he will know that the windshield wipers are being driven at or near their slowest speed, with a relatively large amount of delay operation. It would be very difficult for the driver to obtain this type of information from a rotatable knob wiper delay device, such as disclosed in the prior art, without actually rotating the knob itself to determine how much rotation thereof can be made in both directions.

In accordance with the provisions of the patent statutes, the principle and mode of operation of the present invention have been explained and illustrated in its preferred embodiment. However, it must be appreciated that the present invention can be practiced otherwise than as specifically explained and illustrated without departing from its spirit or scope.

What is claimed is:

1. A control stalk adapted to be mounted on a turn signal lever extending outwardly from a steering column of a vehicle for controlling the operation of a device within the vehicle comprising:
 a body portion having an elongated slot therein; and
 a rheostat enclosed within said body portion including an arm which extends outwardly from said rheostat and through said slot in said body portion, a first portion of said arm being linearly movable along a resistance element of said rheostat from a first end thereof to a second end, a second portion of said arm extending outwardly from said body portion through said slot to thereby permit an operator to vary the effective electrical resistance of said rheostat by movement of of said arm, the operation of the device being controlled in response to said effective electrical resistance.

2. The invention defined in claim 1 wherein said body portion includes a housing and wherein said rheostat is disposed in said housing.

3. A control stalk adapted to be connected to a turn signal lever extending outwardly from a steering column of a vehicle for controllig the operation of a device within the vehicle comprising:

a generally cylindrical body portion;

a switch assembly housing including an enlarged rear portion formed on said body portion, an upstanding flat panel formed on said body portion, and a cover removably secured to said rear portion adapted to extend therefrom to said panel to close said housing, said switch assembly housing defining a pair of opposed ends thereof; and a rheostat enclosed within said housing including an arm which extends outwardly from said housing through an elongated slot formed in said housing and which includes a first portion linearly movable along a resistance element of said rheostat from a first end thereof to a second end a second portion of said arm extending outwardly from said housing through said slot to thereby permit an operator to vary the electrical resistance of said rheostat, the operation of the device being controlled in response to said electrical resistance.

4. The invention defined in claim 3 wherein said switch assembly housing is generally rectangular in cross section.

5. The invention defined in claim 3 wherein said switch assembly housing is disposed above aid cylindrical body portion.

6. The invention defined in claim 3 further including a button attached to said second portion of said arm extending upwardly out of said switch assembly housing.

7. The invention defined in claim 6 wherein said slot is formed between portions of said cover and said panel.

8. A control stalk adapted to be connected to a turn signal lever extending outwardly from a steering column of a vehicle for controlling a period of time between successive cycles of operation of a cyclically actuated device within the vehicle comprising:

a body portion having an elongated slot therein; and first means for controlling said period of time between successive cycles of operation of said cyclically actuated device, said first means being carried by said body portion including an arm which extends outwardly from said first means, and through said slot in said body portion, one portion of said arm being linearly movable from a first end of said first means to a second end thereof, a second portion of said arm extending outwardly from said body portion, through said slot to thereby permit an operator to vary the period of time between successive cycles of operation of the cyclically actuated device.

9. The invention defined in claim 8 further including second means carried by said body portion for selectively enabling and disabling the operation of the cyclically actuated device.

* * * * *